United States Patent [19]
Blood et al.

[11] 3,716,576
[45] Feb. 13, 1973

[54] OXIDATIVE DEHYDROGENATION PROCESS FOR PREPARING UNSATURATED ORGANIC COMPOUNDS

[75] Inventors: Alden E. Blood; Herschel T. Vinyard, both of Longview, Tex.

[73] Assignee: Eastman Kodak Company, Rochester, N.Y.

[22] Filed: July 22, 1969

[21] Appl. No.: 847,789

Related U.S. Application Data

[63] Continuation-in-part of Ser. No. 550,518, May 16, 1966, abandoned.

[52] U.S. Cl.............260/486 D, 260/465.9, 260/540, 260/561 N, 260/593 P, 23/152, 203/12, 203/71
[51] Int. Cl...........................C07c 69/52, B01d 3/00
[58] Field of Search...260/486 D, 465.9, 540, 561 N, 260/593 P; 23/152; 203/71, 84, 12, 152

[56] References Cited

UNITED STATES PATENTS

| | | | |
|---|---|---|---|
| 3,247,273 | 4/1966 | Mantell et al. | 260/669 |
| 3,377,403 | 4/1968 | Bajars | 260/680 |
| 2,719,171 | 9/1955 | Kalb | 260/486 D |
| 2,921,101 | 1/1960 | Macgovern | 260/683.3 X |
| 2,723,300 | 11/1955 | Lewis, Jr. | 260/683.3 |
| 3,442,933 | 5/1969 | Hagemeyer et al. | 260/486 D |
| 2,833,700 | 5/1958 | Baumgartner et al. | 203/12 |
| 2,861,924 | 11/1958 | Raifsnider | 23/152 X |
| 2,870,066 | 1/1959 | Pierotti | 23/152 X |
| 3,044,862 | 7/1962 | Paul | 23/152 X |
| 3,366,553 | 1/1968 | Bulls et al. | 203/12 |
| 3,425,798 | 2/1969 | Stutman et al. | 260/486 D |

Primary Examiner—Wilbur L. Bascomb, Jr.
Attorney—John A. Gazewood and C. D. Quillen, Jr.

[57] ABSTRACT

A process for obtaining salt-free aqueous hydrogen iodide from the crude reaction mixture resulting from the oxidative dehydrogenation of organic compounds in the presence of an iodine-containing material. The process comprises separating the organic product from the crude reaction mixture and distilling in two stages the aqueous layer containing hydrogen iodide to obtain an aqueous composition consisting essentially of hydrogen iodide. The aqueous hydrogen iodide composition is recycled to the reaction zone. The process is particularly useful in those oxidative dehydrogenation processes wherein hydrogen iodide hydrate is employed as a catalyst.

7 Claims, 1 Drawing Figure

PATENTED FEB 13 1973　　　　　　　　　　　3,716,576
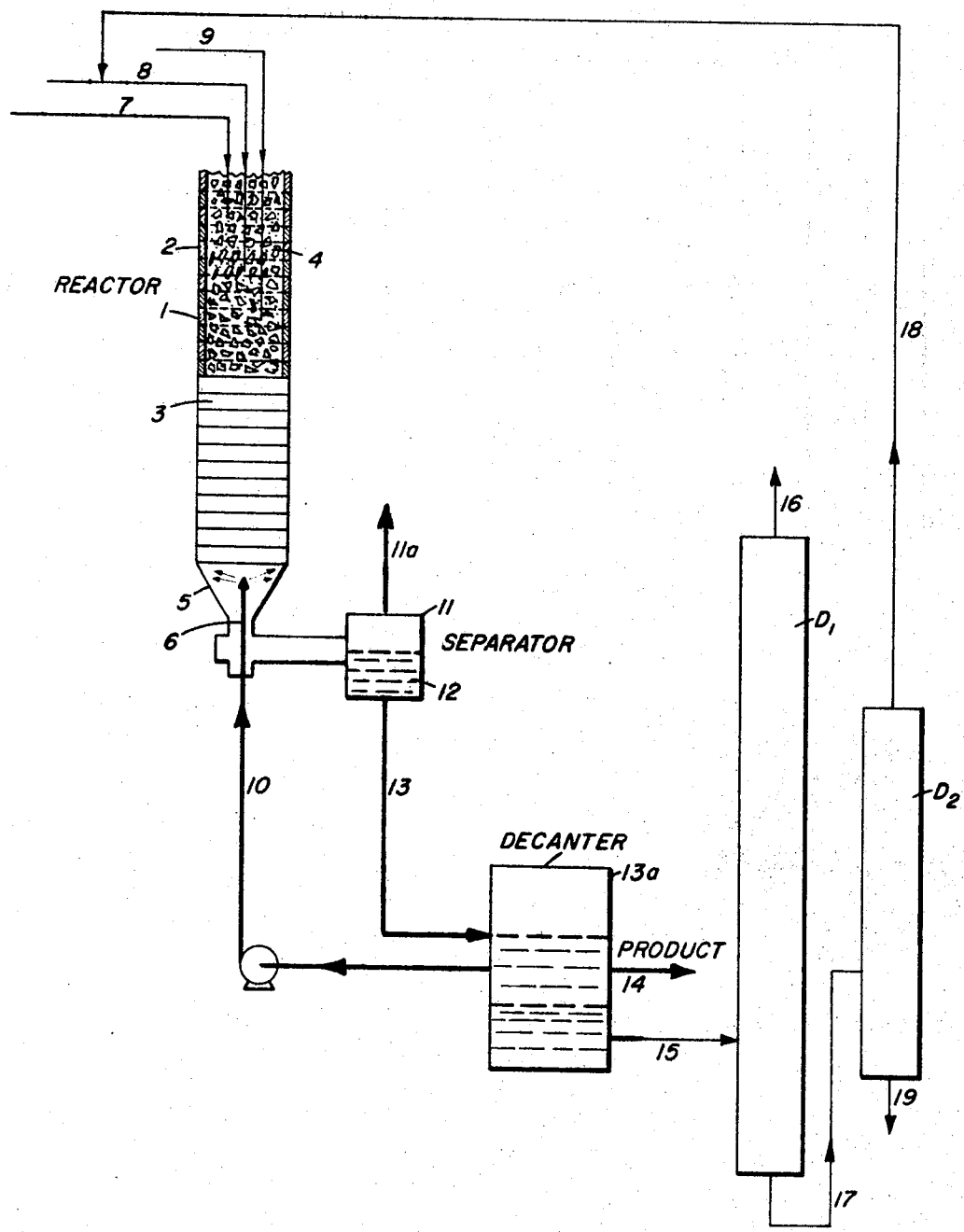
ALDEN E. BLOOD
HERSCHEL T. VINYARD
INVENTORS
BY William H. J. Kline
W. H. McDowell
ATTORNEY & AGENT

OXIDATIVE DEHYDROGENATION PROCESS FOR PREPARING UNSATURATED ORGANIC COMPOUNDS

This application is a continuation-in-part of Ser. No. 550,518, filed May 16, 1966 and now abandoned.

This invention relates to an oxidative dehydrogenation process for the production of unsaturated organic compounds and more particularly to the recovery of hydrogen iodide in the process.

In certain oxidative dehydrogenation processes for the production of unsaturated organic compounds a mixture of a saturated organic compound and an iodine compound such a hydrogen iodide or iodine is heated in the presence of oxygen. The resulting reaction mixture contains, in addition to the unsaturated organic compound, unreacted hydrogen iodide and in some cases also iodine. The unsaturated organic compound is then separated out of the reaction mixture leaving an aqueous phase containing hydrogen iodide from which is it desirable to recover the hydrogen iodide for reuse in the process.

The recovery of hydrogen iodide from aqueous solutions is generally effected by chemical means such as extraction or physical means such as distillation. For example, in the process described in the Blood and Hagemeyer U. S. patent application Ser. No. 388,196 filed Aug. 7, 1964 and now abandoned, a mixture of an organic compound such as methyl isobutyrate and an aqueous solution of hydrogen iodide hydrate is heated in the presence of oxygen in a reactor, preferably packed with siliceous elements such as silica or silicon carbide. The effluent is quenched and the unsaturated product such as methyl methacrylate is separated from the aqueous phase containing hydrogen iodide and low boiling organic compounds such as methyl alcohol and acetone, higher boiling organic compounds, residual metallic salts, and in some cases, a small amount of polymer. The direct distillation of this aqueous phase containing hydrogen iodide removes the lower boiling organic compounds leaving an aqueous hydrogen iodide residue which can be recycled to the reactor. However, when this aqueous residue of the distillation is recycled to the reactor, the course of reaction tends to change particularly in that carbonization takes place which reduces heat transfer in the reactor and lowers the efficiency of the process. These problems arise particularly when the process is carried out in a reactor provided with siliceous elements such as silicon carbide packing.

We have discovered that in the oxidative dehydrogenation process using aqueous solutions of hydrogen iodide hydrate a series of distillation steps should be used for recovering the hydrogen iodide from the reaction mixture, in a form such that the hydrogen iodide will not adversely affect the course of the reaction and the efficiency of the process. According to our invention, the aqueous effluent from the reactor containing unsaturated organic compound, unreacted organic compound and a mixture of organic by-products including alcohol and acetone is quenched, preferably with organic product. The unsaturated product, usually insoluble in water, is then separated from the aqueous phase containing hydrogen iodide, for example, by decantation. The resulting aqueous phase containing hydrogen iodide is then subjected to a primary distillation for the removal overhead of water and low boiling organic compounds such as alcohol and acetone. As a result, the aqueous distillation residue becomes more concentrated in hydrogen iodide and may contain, for example, about 30–40 percent hydrogen iodide. Upon distillation of this residue, there is obtained overhead an aqueous solution of hydrogen iodide substantially free of organic compounds. This distillate may be a constant boiling mixture of hydrogen iodide in water containing about 57 percent hydrogen iodide. The distillate is then preferably diluted with water to about 20 percent strength before recycling to the reactor. When the hydrogen iodide is recovered in this manner, it has no adverse effect on the course of the reaction or the efficiency of the process. It is described in considerable detail in the above invention of Blood and Hagemeyer that the use of hydrogen iodide hydrate in oxidative dehydrogenation processes results in the direct production of unsaturated organic product substantially free of iodine. In similar oxidative dehydrogenation processes operating under anhydrous conditions using iodine or anhydrous hydrogen iodide, the reaction produces unsaturated product containing substantial amounts of iodine which must be removed thereby increasing the cost of operation.

It will be seen from the following descriptions that our method for recovering hydrogen iodide yields aqueous solutions of hydrogen iodide hydrate particularly suited for use in an oxidative dehydrogenation process carried out in a reactor wherein the reaction mixture is separated from the walls of the reactor, such as steel or iron walls, by means of siliceous elements such as silicon carbide. Thus, the reactor can be provided throughout its length with silicon carbide sleeves and packed with pieces of silicon carbide or all or a portion of the reactor may contain circular plate members provided with an annular depression such that the reaction mixture flows down through the reactor in an arcuate path.

The accompanying drawing shows in diagrammatic form a representative oxidative dehydrogenation process and a process for recovering hydrogen iodide from the reaction mixture. The reactor 1 contains in the upper portion siliceous sleeves 2 of, for example, silicon carbide and random siliceous packing 4 separating the reactants from the metal walls of the reactor. The lower part of the reactor contains circular silicon carbide plate members 3 having an annular depression containing an aperture communicating with the aperture of an adjacent circular plate member as described in more detail in U. S. patent application Ser. No. 530,127, filed Feb. 25, 1966. The sleeves and circular plate members thus isolate the reaction mixture from the walls of the reactor and the plate members cause the vapors to pass down through the reactor in an arcuate path thereby increasing linear velocity and heat transfer in the reactor. However, the reactor can be provided throughout its entire length with the silicon carbide sleeves and random silica or silicon carbide packing, but this is less preferred.

An aqueous solution of hydrogen iodide hydrate, for example a 20 percent aqueous hydrogen iodide solution, is passed into the heated reactor 1 through line 8 and mixed with the saturated organic compound entering the reactor through line 7. A mixture of hydrogen iodide hydrate and organic compound passes down the reactor and combines with air entering through line 9. The mixture then passes down the reactor in an arcuate path through the circular plates 3. The effluent stream from the reactor is quickly quenched in chamber 5 by means of a cool spray, preferably of the organic product recycled from the decanter through line 10. The quenched stream then passes into the liquid-gas separator 11, the non-condensed gas passing through line 11a to a scrubber, not shown, for recovery of entrained organic materials. The condensed effluent 12 is then passed through line 13 to the decanter 13a where the water-insoluble unsaturated product such as methyl methacrylate separates out in the upper layer and is withdrawn through line 14 for recovery. The lower aqueous layer of the decanter containing hydrogen iodide and a mixture of organic compounds is passed through line 15 to distillation tower $D_1$. In order to recover the hydrogen iodide in a form suitable for recycling to the reactor, water and the lower boiling organic compounds are taken off overhead through line 16. The distillation residue then passes out of the bottom of the column through line 17 to column $D_2$ where the aqueous solution of hydrogen iodide is taken off overhead and recycled, preferably after dilution, through line 18 to the reactor. Waste material is drawn off the bottom of column $D_2$ through line 19. The distillation column $D_1$ is a conventional glass or ceramic-lined fractionating column packed or containing bubble trays for distilling off the low boiling materials including water, acetone and methyl alcohol in the presence of the aqueous hydrogen iodide solution. Column $D_2$ is a glass-lined evaporator for rapidly distilling out the aqueous hydrogen iodide solution for recycle to the reactor. It may be desirable to replace the evaporator $D_2$ by a fractionating column depending upon the exact composition of the feed from the bottom of column $D_1$. Columns $D_1$ and $D_2$ can be replaced by a single fractionating column, the low boiling material being taken off overhead and the concentrated hydrogen iodide solution drawn off near the base of the column. However, the efficiency of the process is best maintained by recovery of the hydrogen iodide using the two columns, $D_1$ and $D_2$, as described above.

The following example will serve to illustrate preferred methods for carrying out the invention.

EXAMPLE

As shown in the drawing, a stream of methyl isobutyrate to be dehydrogenated is fed through line 7 into a heated reactor 1, containing silicon carbide, sleeves 2, packing 4 and circular plates 3, and mixed at a point in the reactor where the temperature is about 350°–450 °C., with an aqueous solution of hydrogen iodide hydrate containing about 20 percent hydrogen iodide entering the reactor through line 8. The resulting mixture contacts the stream of air entering through line 9 at a point in the reactor where the temperature is about 450°C. to 650°C. The molar ratio of the methyl isobutyrate to oxygen is about 6:1. The effluent passes from the bottom of the reactor into the titanium quench chamber 5 and is quickly quenched using a cooled spray of the organic product recycled from the decanter through line 10, so as to reduce the temperature of the product stream to about 20° to 80°C. The quenched stream is then passed into the liquid-gas separator, the non-condensed gas going to a scrubber for recovery of entrained organic material. The condensed effluent is then passed through line 13 to the decanter where the effluent separates into an upper water-insoluble layer containing methyl methacrylate and a lower layer containing the aqueous hydrogen iodide composition from which hydrogen iodide is to be recovered and eventually recycled to the reactor. The composition of a typical organic layer of the decanter is 73.5 parts methyl isobutyrate, 15 parts methyl methacrylate, 10 parts isobutyric acid, 1.5 part water and 0.05 part iodine. Small amounts of methyl iodide, acetone, methyl alcohol and methyl acrylate may also be present. The organic layer is then passed out of the decanter through line 14 for recovery of the methyl methacrylate.

The lower aqueous hydrogen iodide layer of the decanter is then passed through line 15 to column $D_1$ where water and the lower boiling compounds including methyl isobutyrate, acetone and methyl alcohol are distilled off. The aqueous distillate taken overhead through line 16 contains about 5–10 percent by weight of organic materials. The distillation residue containing, for example, 30–40 percent hydrogen iodide and the higher boiling organic compounds, passes out of the bottom of the column through line 15 to evaporator $D_2$ where the aqueous hydrogen iodide solution substantially free of organic material is flashed overhead. The aqueous hydrogen iodide solution obtained may be a constant boiling mixture of about 57 percent hydrogen iodide. Sufficient water is then added to the distillate to obtain a 20 percent hydrogen iodide solution which is recycled as needed through line 18 to the reactor. As stated previously, when the hydrogen iodide is recovered in this manner, it has no adverse affect upon the course of the oxidative dehydrogenation reaction, particularly when utilized in reactors packed with silicon carbide elements, and good heat transfer and high efficiency can be maintained in the process over long periods of continuous operation.

The process of the above example can be readily adapted to the oxidative dehydrogenation of other organic compounds. Such organic compounds normally will contain from 2 to 20 carbon atoms and are characterized in general by the presence in their molecules of two adjacent carbon atoms each of which contains at least one hydrogen atom. The organic compounds include esters of the formula

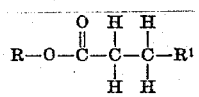

wherein R is alkyl of 1 to 8 carbon atoms and preferably 1 to 4 carbon atoms, phenyl or cyclohexyl and $R^1$ is hydrogen or alkyl of 1 to 9 carbon atoms; alkanes having from 2 to 8 carbon atoms; alkenes having from 4 to 8 carbon atoms; aromatic hydrocarbons substituted with one to three alkyl groups, wherein said alkyl groups preferably contain 2 or 3 carbon atoms; ketones of the formula

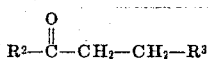

wherein $R^2$ is alkyl of 1 to 8 carbon atoms and preferably 1 to 4 carbon atoms, cyclohexyl or phenyl and $R^3$ is hydrogen or alkyl of 1 to 6 carbon atoms and preferably 1 or 2 carbon atoms; acids and amides of the formulas $$R^4-CH_2-CH_2-COOH$$

and $$R^4-CH_2-CH_2-CONH_2,$$

wherein $R^4$ is alkyl of 1 to 9 carbon atoms and preferably 1 to 5 carbon atoms; anhydrides corresponding to the mentioned acids; nitriles of the formula $$R^5-CH_2-CH_2-CN,$$

wherein $R^5$ is hydrogen or an alkyl group of 1 to 5 carbon atoms and including cyclic nitriles such as cyclohexene nitrile; as well as aldehydes and heterocyclic organic compounds containing two adjacent carbon atoms, each of which contain at least one hydrogen atom, and which are stable at the reaction temperatures. The process is particularly adapted to the oxidative dehydrogenation of lower alkyl esters of aliphatic monobasic acids of at least three carbon atoms. Thus, methyl 2-methylpentanoate yields methyl 2-methylpentenoate; methyl 2-ethylhexanoate yields methyl $C_8$ unsaturated esters, and isobutyric acid yields methacrylic acid. In these cases the aqueous component of the effluent is also separated from the unsaturated product and subjected to the two distillation steps as described for obtaining hydrogen iodide solution substantially free of organic compounds.

The invention has been described in considerable detail with particular reference to certain preferred embodiments thereof, but it will be understood that variations and modifications can be effected within the spirit and scope of the invention as described hereinabove.

We claim:

1. In a process for producing unsaturated organic product by oxidative dehydrogenation of an organic compound wherein a mixture of the organic compound, hydrogen iodide hydrate and oxygen is heated and the unsaturated product is separated from the reaction mixture leaving an aqueous composition containing water soluble organic compounds and hydrogen iodide, the improvement which comprises the steps of recovering the hydrogen iodide by: (1) distilling the aqueous composition to yield and overhead stream comprising water and the lower boiling organic compounds and a bottoms stream comprising aqueous hydrogen iodide, organic reaction products and residual metal salts; (2) distilling from said bottom stream a second overhead stream consisting essentially of an aqueous solution of hydrogen iodide; and (3) recycling said second overhead stream to the oxidative dehydrogenation reaction.

2. In a process for the oxidative dehydrogenation of an organic compound selected from the class consisting of organic esters having the general formula $$R-O-\overset{O}{\underset{\|}{C}}-CH_2-CH_2-R^1$$

wherein R is alkyl of 1 to 8 carbon atoms, phenyl or cyclohexyl and $R^1$ is hydrogen or alkyl of 1 to 9 carbon atoms; alkanes having from 2 to 8 carbon atoms, alkenes having from 4 to 8 carbon atoms, cyclohexane, ethylcyclohexane, cyclohexene, ethylbenzene, diethylbenzene or cumene; aliphatic ketones having the general formula $$R^2-\overset{O}{\underset{\|}{C}}-CH_2-CH_2-R^3$$

wherein $R^2$ is alkyl of 1 to 8 carbon atoms, cyclohexyl or phenyl and $R^3$ is hydrogen or alkyl of 1 to 6 carbon atoms, cyclohexyl ketone or propiophenone; carboxylic acids having the general formula $$R^4-CH_2-CH_2-COOH,$$ and aliphatic amides having the general formula $$R^4-CH_2-CH_2-CONH_2,$$

wherein $R^4$ is hydrogen or alkyl of 1 to 9 carbon atoms; and nitriles having the general formula $$R^5-CH_2-CH_2-CN,$$

wherein $R^5$ is hydrogen or an alkyl group of 1 to 5 carbon atoms or cyclohexene carbonitrile; which comprises contacting acid organic compound with an iodine-containing compound and oxygen in the vapor phase at elevated temperatures and pressures, whereby said organic compound is converted to a corresponding organic compound having a higher carbon:hydrogen ratio; quenching the crude reaction mixture; separating from said quenched crude reaction mixture to obtain organic product and an aqueous composition comprising water-soluble organic compounds, reaction salts and hydrogen iodide and recycling said aqueous composition to the oxidative dehydrogenation reaction zone; the improvement comprising distilling said aqueous composition to obtain a first overhead stream comprising water and low-boiling organic compounds and a first residue enriched in hydrogen iodide; distilling said first residue enriched in hydrogen iodide to obtain a second overhead stream consisting essentially of aqueous hydrogen iodide and recycling said second overhead stream to the oxidative dehydrogenation reaction zone.

3. In a process according to claim 2, wherein a reaction mixture of said organic compound and hydrogen iodide as aqueous hydrogen iodide hydrate are heated to a temperature in the range of 300° to 400°C. and the heated mixture is contacted with oxygen at a temperature in the range of about 400° to about 750°C.; the improvement comprising distilling said aqueous composition to obtain a first overhead stream comprising water and low-boiling organic compounds and a first residue enriched in hydrogen iodide; distilling said first residue enriched in hydrogen iodide to obtain a second overhead stream consisting essentially of aqueous hydrogen iodide and recycling said second overhead stream to the oxidative dehydrogenation reaction zone.

4. In a process according to claim 3, wherein said organic compound and said hydrogen iodide as aqueous hydrogen iodide hydrate are heated separately to a temperature in the range of about 300° to about 400°C. and the heated materials are admixed with oxygen at a temperature in the range of 400° to 750°C.; the improvement comprising distilling said aqueous composition to obtain a first overhead stream comprising water and low-boiling organic compounds and a first residue enriched in hydrogen iodide; distilling said first residue enriched in hydrogen iodide to obtain a second overhead stream consisting essentially of aqueous hydrogen iodide and recycling said second overhead stream to the oxidative dehydrogenation reaction zone.

5. In a process according to claim 4, which comprises separately heating the organic compound to a temperature between 200° and 350°C. whereby said compound is vaporized; separately heating hydrogen iodide as aqueous hydrogen iodide hydrate to a temperature between 300° and 400°C.; mixing said heated materials; introducing said heated mixutre into a reaction zone heated to a temperature in the range of 400° to 750°C; and contacting said heated mixture in said heated reaction zone with molecular oxygen; the improvement comprising distilling said aqueous composition to obtain a first overhead stream comprising water and low-boiling organic compounds and a first residue enriched in hydrogen iodide; distilling said first residue enriched in hydrogen iodide to obtain a second overhead stream consisting essentially of aqueous hydrogen iodide and recycling said second overhead stream to the oxidative dehydrogenation reaction zone.

6. A process according to claim 5 wherein said organic compound is methyl isobutyrate.

7. A process according to claim 4 wherein said first residue contains up to about 40 percent hydrogen iodide and said second overhead stream consisting essentially of aqueous hydrogen iodide is diluted with water to reduce the hydrogen iodide concentration to about 20 percent.

* * * * *

UNITED STATES PATENT OFFICE
CERTIFICATE OF CORRECTION

Patent No. 3,716,576            Dated February 13, 1973

Inventor(s) Alden E. Blood, Herschel T. Vinyard

It is certified that error appears in the above-identified patent and that said Letters Patent are hereby corrected as shown below:

Column 4, lines 51-54, delete the formula

" 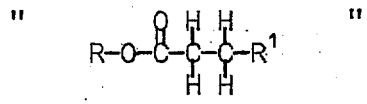 "

and insert

--- 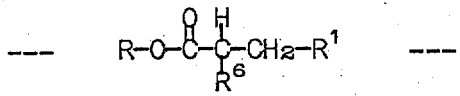 ---

Column 4, line 62, before ";" insert ---, and $R^6$ is hydrogen or alkyl of 1 to 2 carbon atoms---.

Column 4, lines 65 to bottom, delete the formula

" 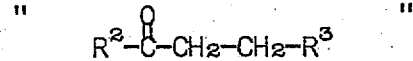 "

and insert

--- 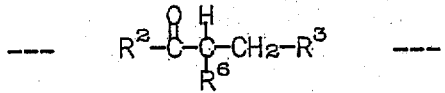 ---

Column 5, line 4, before the ";" insert ---, and $R^6$ is hydrogen or alkyl of 1 to 2 carbon atoms---.

Column 5, lines 6-11, delete the formulas

UNITED STATES PATENT OFFICE
CERTIFICATE OF CORRECTION

Patent No. 3,716,576            Dated February 13, 1973

Inventor(s) Alden E. Blood, Herschel T. Vinyard

It is certified that error appears in the above-identified patent and that said Letters Patent are hereby corrected as shown below:

— 2 —

" $R^4-CH_2-CH_2-COOH$ and $R^4-CH_2-CH_2-CONH_2$, "

and insert

--- $R^4-CH_2-\underset{R^6}{\overset{H}{C}}-COOH$ and $R^4-CH_2-\underset{R^6}{\overset{H}{C}}-CONH_2$, ---

Column 5, line 13, before the ";" insert ---, and $R^6$ is as previously defined---.

Column 5, line 17, delete the formula

" $R^5-CH_2-CH_2-CN$ "

and insert

--- $R^5-CH_2-\underset{R^6}{\overset{H}{C}}-CN$ ---

UNITED STATES PATENT OFFICE
CERTIFICATE OF CORRECTION

Patent No. 3,716,576                                   Dated February 13, 1973

Inventor(s) Alden E. Blood, Herschel T. Vinyard

It is certified that error appears in the above-identified patent and that said Letters Patent are hereby corrected as shown below:

- 3 -

Column 5, line 20, before the ";" insert ---, and $R^6$ is as previously defined---.

Column 5, lines 65 to bottom, delete the formula

" 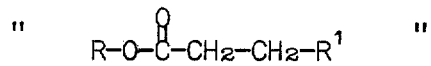 "

and insert

--- 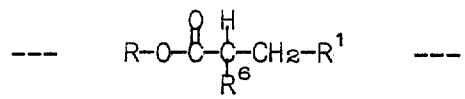 ---

Column 6, line 6, before the ";" insert ---, and $R^6$ is hydrogen or alkyl of 1 to 2 carbon atoms---.

Column 6, lines 9-11, delete the formula

" 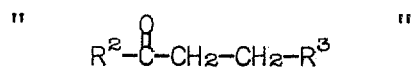 "

and insert

--- 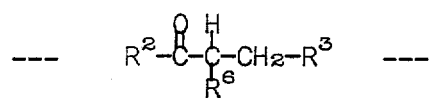 ---

Column 6, line 14, before the ";" insert ---, and $R^6$ is as defined above---.

UNITED STATES PATENT OFFICE
CERTIFICATE OF CORRECTION

Patent No. 3,716,576      Dated February 13, 1973

Inventor(s) Alden E. Blood, Herschel T. Vinyard

It is certified that error appears in the above-identified patent and that said Letters Patent are hereby corrected as shown below:

- 4 -

Column 6, line 17, delete the formula

" 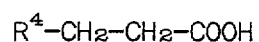 "

and insert

--- 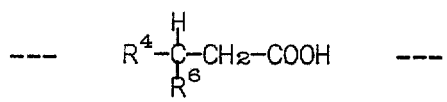 ---

Column 6, line 20, delete the formula

" 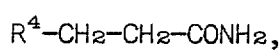 "

and insert

--- 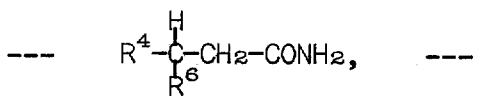 ---

Column 6, line 21, before the ";" insert ---, and $R^6$ is as defined above---.

Column 6, line 24, delete the formula

" 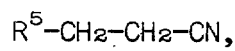 "

and insert

--- 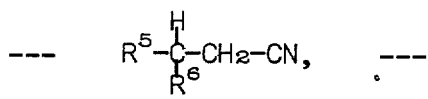 ---

UNITED STATES PATENT OFFICE
CERTIFICATE OF CORRECTION

Patent No. 3,716,576  Dated February 13, 1973

Inventor(s) Alden E. Blood, Herschel T. Vinyard

It is certified that error appears in the above-identified patent and that said Letters Patent are hereby corrected as shown below:

- 5 -

Column 6, line 27, before the ";" insert ---, and $R^6$ is as defined above---.

Column 7, line 16, delete "mixutre" and insert ---mixture---.

Signed and sealed this 3rd day of July 1973.

(SEAL)
Attest:

EDWARD M. FLETCHER, JR.　　　　　　　　Rene Tegtmeyer
Attesting Officer　　　　　　　　　　　　Acting Commissioner of Patents